US012723217B2

(12) United States Patent
Watanabe et al.

(10) Patent No.: US 12,723,217 B2
(45) Date of Patent: Sep. 1, 2026

(54) FILTER FOR INHIBITING DEGRADATION OF EDIBLE OILS, AND METHOD FOR PRODUCING SAME

(71) Applicant: NSK LTD., Tokyo (JP)

(72) Inventors: Yuya Watanabe, Kanagawa (JP); Kenichi Iso, Kanagawa (JP); Jyunichi Shikuma, Kanagawa (JP); Takeshi Murakami, Kanagawa (JP)

(73) Assignee: NSK LTD., Tokyo (JP)

( * ) Notice: Subject to any disclaimer, the term of this patent is extended or adjusted under 35 U.S.C. 154(b) by 178 days.

(21) Appl. No.: 18/580,402

(22) PCT Filed: Jul. 25, 2022

(86) PCT No.: PCT/JP2022/028672

§ 371 (c)(1),
(2) Date: Jan. 18, 2024

(87) PCT Pub. No.: WO2023/008391

PCT Pub. Date: Feb. 2, 2023

(65) Prior Publication Data

US 2025/0075146 A1 Mar. 6, 2025

(30) Foreign Application Priority Data

Jul. 26, 2021 (JP) ................................ 2021-121669
Nov. 24, 2021 (JP) ................................ 2021-190490
Nov. 24, 2021 (JP) ................................ 2021-190491

(51) Int. Cl.
*C11B 3/00* (2006.01)
*C11B 3/10* (2006.01)

(52) U.S. Cl.
CPC .............. *C11B 3/008* (2013.01); *C11B 3/001* (2013.01); *C11B 3/10* (2013.01)

(58) Field of Classification Search
CPC .......... C11B 3/008; C11B 3/10; Y02W 30/74; A47J 37/1223; B01D 2239/0407;
(Continued)

(56) References Cited

U.S. PATENT DOCUMENTS 4,988,440 A 1/1991 Bernard et al.
5,348,755 A 9/1994 Roy
2021/0229066 A1* 7/2021 Malaba .................... B01J 20/24

FOREIGN PATENT DOCUMENTS

JP 3-051365 A 3/1991
JP 6-192990 A 7/1994
(Continued)

OTHER PUBLICATIONS

International Search Report (PCT/ISA/210) dated Sep. 6, 2022, issued by the International Searching Authority in counterpart International Application No. PCT/JP2022/028672.
(Continued)

*Primary Examiner* — Changqing Li
(74) *Attorney, Agent, or Firm* — Sughrue Mion, PLLC

(57) ABSTRACT

A cooking oil degradation suppression filter that can effectively and easily suppress degradation of cooking oil without using a filter aid or the like and can prevent a decrease in the taste of food caused by separation of a degradation suppression agent. The cooking oil degradation suppression filter includes fiber (10) and at least one degradation suppression agent (13) selected from a carbonate, a silicate, a tartrate, an oxide, a hydroxide, an alginate, and a phosphate.

17 Claims, 2 Drawing Sheets

(58) Field of Classification Search
CPC .... B01D 2239/0492; B01D 2239/0645; B01D 2239/10; B01D 39/16; B01D 39/1607; B01D 39/1615; B01D 39/1623
See application file for complete search history.

(56) References Cited

FOREIGN PATENT DOCUMENTS

| | | | | | |
|---|---|---|---|---|---|
| JP | 6-510563 | A | | 11/1994 | |
| JP | 11-137932 | A | | 5/1999 | |
| JP | 2000189733 | A | * | 7/2000 | |
| JP | 2006-334221 | A | | 12/2006 | |
| JP | 2008272600 | A | * | 11/2008 | |
| JP | 2010-65077 | A | | 3/2010 | |
| JP | 4593127 | B2 | * | 12/2010 | |
| JP | 2020-32413 | A | | 3/2020 | |
| JP | 6763219 | B2 | | 9/2020 | |
| JP | 2021-630 | A | | 1/2021 | |
| JP | 2021-1247 | A | | 1/2021 | |
| WO | WO-03075671 | A1 | * | 9/2003 | ............ A23B 20/30 |
| WO | 2020/049361 | A1 | | 3/2020 | |

OTHER PUBLICATIONS

Written Opinion (PCT/ISA/237) dated Sep. 6, 2022, issued by the International Searching Authority in counterpart International Application No. PCT/JP2022/028672.
Extended European Search Report dated Oct. 29, 2024, issued by the European Patent Office in European Application No. 22849452.2.
Communication dated Mar. 24, 2026, issued by the Japanese Patent Office in Japanese Application No. 2026-008211.

* cited by examiner

FILTER FOR INHIBITING DEGRADATION OF EDIBLE OILS, AND METHOD FOR PRODUCING SAME

CROSS-REFERENCE TO RELATED APPLICATIONS

This application is a National Phase Entry of PCT International Application No. PCT/JP2022/028672 filed on Jul. 25, 2022, which claims priority to Japanese Patent Application No. 2021-121669 filed on Jul. 26, 2021, Japanese Patent Application No. 2021-190490 filed on Nov. 24, 2021, and Japanese Patent Application No. 2021-190491 filed on Nov. 24, 2021, the contents of all of which are incorporated herein by reference in their entirety.

TECHNICAL FIELD

The present invention relates to a cooking oil degradation suppression filter that can suppress oxidative degradation of cooking oil and a method of manufacturing the same.

BACKGROUND ART

Cooking oil is used for various foods. Cooking oil used for cooking fried food such as fried food or fried potato is oxidatively degraded by heating during cooking or leaving, which may degrade the taste, smell, and appearance of food to cause food poisoning. The viscosity of the oxidatively degraded oil increases, and the oil separability deteriorates. Therefore, the cooking oil that is oxidatively degraded to a predetermined standard or more is discarded. Therefore, from the viewpoint of global environment protection, it is desirable to retard the oxidative degradation of cooking oil as much as possible to reduce the number of times of discarding cooking oil. By reducing the number of times of discarding cooking oil, there is an advantageous effect in that the number of times of cleaning a fried food cooker (fryer) used for fried food is reduced and the amount of water used for cleaning is reduced.

Accordingly, to suppress oxidative degradation of cooking oil, various filters for cooking oil have been proposed in the related art.

For example, Patent Literature 1 discloses a method in which a tartrate is used as a detergent for cooking oil and the detergent is added to cooking oil as it is. Patent Literature 1 describes a filter in which potassium hydrogen tartrate is interposed between paper and the edge of the paper is closed in a bag shape.

Patent Literature 2 discloses a filter where a cooking oil degradation suppression agent is attached using a binder to at least either or both of a surface of a filter medium and inner surfaces of pores.

Patent Literature 3 describes a filter for filtering cooking oil obtained by stirring and mixing fiber such as pulp and an adsorbent such as activated carbon powder in water and dehydrating the mixture by compression molding.

CITATION LIST

Patent Literature

Patent Literature 1: JP6763219B
Patent Literature 2: JP2021-630A
Patent Literature 3: JP4593127B

SUMMARY OF INVENTION

Technical Problem

However, as described in Patent Literature 1, when the detergent for cooking oil is directly added to cooking oil, the detergent may be attached to the food to deteriorate the taste of the food. In the bag-shaped filter structure where the detergent for cooking oil is interposed between paper, when the paper is ripped, the detergent in the filter may leak. Therefore, as in the case where the detergent for cooking oil is directly added, the taste of the food may deteriorate, and there is room for further improvement.

When the filter described in Patent Literature 2 is manufactured, the filter medium needs to be manufactured in advance such that an additive is attached to the filter medium. Therefore, the manufacturing cost increases, and an increase in environmentally hazardous substances or energy required for manufacturing is concerned. Since the cooking oil degradation suppression agent is attached to the filter medium through the binder, a part of the degradation suppression agent is covered with the binder such that the contact efficiency with the cooking oil decreases. Accordingly, to sufficiently obtain the degradation suppression effect for cooking oil, a large amount of the degradation suppression agent is required.

In the filter described in Patent Literature 3, the adsorbent is attached to the fiber. Therefore, the decoloration and deodorization effect can be sufficiently obtained, but the degradation of cooking oil cannot be sufficiently suppressed. Accordingly, it is difficult to reduce the number of times of discarding cooking oil. From the viewpoint of global environment protection, there is room for further improvement. When an adhesive strength between the fiber and the adsorbent is weak, the adsorbent is separated from the fiber, and the taste of the food may deteriorate as in Patent Literature 1.

In the filter for cooking oil that is generally used, a powder filter aid that is scattered on filter paper may be necessary. The filter aid has an action of suppressing the degradation of cooking oil but is in a powder form. Therefore, the filter aid flies when being scattered, and needs to be collected in the form of a clay during cleaning after filtration, which causes a problem of a decrease in work efficiency.

The present invention has been made considering the problems, and an object thereof is to provide a cooking oil degradation suppression filter that can effectively and easily suppress degradation of cooking oil without using a filter aid or the like and can prevent a decrease in the taste of food caused by separation of a degradation suppression agent.

Another object of the present invention is to provide a method of manufacturing a cooking oil degradation suppression filter in which a cooking oil degradation suppression filter having an excellent degradation suppression function can be easily manufactured and formation of environmentally hazardous substances during manufacturing can be suppressed such that global environment protection can be realized.

To achieve the object, the present applicant has proposed Japanese Patent Application No. 2021-121669 that is a technique that can effectively and easily suppress degradation of cooking oil without using a filter aid or the like and can prevent a decrease in the taste of food caused by separation of a degradation suppression agent.

Japanese Patent Application No. 2021-121669 has proposed a method of manufacturing a cooking oil degradation suppression filter called "papermaking", the method including: adding fiber that is a filter substrate and a degradation suppression agent to water and diffusing and mixing the components to prepare an aqueous suspension; and dehydrating and drying the aqueous suspension. In the manufacturing method, the degradation suppression agent can be held by the fiber without using the binder or the like. Therefore, the degradation of cooking oil can be effectively prevented, and the filter where the separation of the degradation suppression agent is prevented can be easily manufactured. A step for manufacturing a filter medium and a step for attaching an additive can be implemented by one step. Therefore, an increase in manufacturing cost can be suppressed, and an increase in environmentally hazardous substances or energy required for manufacturing can be suppressed. Water is used as a dispersion medium, which also contributes to global environment protection.

However, in the above manufacturing method, when an oxide such as calcium oxide or magnesium oxide, in particular, an alkaline earth metal oxide that is generally known as a deoxidant is used as the degradation suppression agent, a hydration reaction represented by the following Formula (1) occurs in the aqueous suspension, and a sufficient degradation suppression function may be lost.

$$MO+H_2O \rightarrow M(OH)_2 \quad (1)$$

M represents an alkaline earth metal.

Accordingly, an object of the present invention is to provide a cooking oil degradation suppression filter and a method of manufacturing the same in which, even when an oxide, in particular, an alkaline earth metal oxide is used as the degradation suppression agent and water is used as a liquid used in the step of obtaining the suspension during the manufacturing of the cooking oil degradation suppression filter considering global environment protection, the loss of the degradation suppression function can be suppressed.

Solution to Problem

The object of the present invention is achieved with the following configuration [1] relating to the cooking oil degradation suppression filter.

[1] A cooking oil degradation suppression filter including:

fiber; and at least one degradation suppression agent selected from a carbonate, a silicate, a tartrate, an oxide, a hydroxide, an alginate, and a phosphate.

Preferable embodiments of the present invention relating to the cooking oil degradation suppression filter are the following [2] to [18].

[2] The cooking oil degradation suppression filter according to [1], in which the degradation suppression agent is at least one selected from a tartrate, an oxide, and a hydroxide.

[3] The cooking oil degradation suppression filter according to [2], in which the degradation suppression agent is an oxide and further includes a hydration reaction retardant formed of a sugar alcohol.

[4] The cooking oil degradation suppression filter according to [3], in which the sugar alcohol is at least one selected from erythritol, glycerin, lactitol, maltitol, mannitol, xylitol, and sorbitol.

[5] The cooking oil degradation suppression filter according to [4], in which the sugar alcohol is either or both of glycerin and sorbitol.

[6] The cooking oil degradation suppression filter according to any of [3] to [5], in which a molecular weight of the sugar alcohol is 500 or lower.

[7] The cooking oil degradation suppression filter according to [2], in which the degradation suppression agent is an oxide and further includes at least one hydration reaction retardant selected from an organic acid salt, a sulfate, a monosaccharide, and a disaccharide.

[8] The cooking oil degradation suppression filter according to [7], in which the hydration reaction retardant includes at least one selected from citric acid, calcium sulfate, and sucrose.

[9] The cooking oil degradation suppression filter according to [7] or [8], in which a molecular weight of the hydration reaction retardant is 500 or lower.

[10] The cooking oil degradation suppression filter according to any one of [3] to [9], in which a content of the hydration reaction retardant is a trace amount.

[11] The cooking oil degradation suppression filter according to [10], in which a content of the hydration reaction retardant is 10 ppm or higher per 1 g of the cooking oil degradation suppression filter.

[12] The cooking oil degradation suppression filter according to any one of [1] to [11], in which the fiber includes refined fiber.

[13] The cooking oil degradation suppression filter according to [12], in which the fiber includes a stem and a branch branched from the stem by refinement, and the branch holds particles including the degradation suppression agent.

[14] The cooking oil degradation suppression filter according to [12] or [13], in which the fiber is either or both of natural fiber and artificial fiber.

[15] The cooking oil degradation suppression filter according to [14], in which the artificial fiber is either or both of regenerated fiber and plastic fiber.

[16] The cooking oil degradation suppression filter according to any one of [1] to [15], in which the degradation suppression agent is present inside the fiber and on a surface of the fiber.

[17] The cooking oil degradation suppression filter according to any one of [1] to [16], further including an adsorbent.

[18] The cooking oil degradation suppression filter according to [17], in which the adsorbent includes at least one selected from silicon dioxide, natural clay, artificial clay, and activated carbon.

The object of the present invention is achieved with the following configuration [19]relating to a method of manufacturing the cooking oil degradation suppression filter.

[19] A method of manufacturing the cooking oil degradation suppression filter according to any one of [1] to [18], the method including:

a step of obtaining a suspension including the fiber and the degradation suppression agent; and a step of removing liquid from the suspension and drying the suspension.

Advantageous Effects of Invention

According to the present invention, it is possible to provide a cooking oil degradation suppression filter that can effectively and easily suppress oxidative degradation of cooking oil without using a filter aid or the like and can prevent separation of a degradation suppression agent.

In the manufacturing method according to the present invention, a cooking oil degradation suppression filter having an excellent degradation suppression function can be easily manufactured. Formation of environmentally hazardous substances during manufacturing can be suppressed such that global environment protection can be realized.

According to the present invention, it is possible to provide a cooking oil degradation suppression filter and a method of manufacturing the same in which, even when water is used as the liquid used in the step of obtaining the suspension during the manufacturing of the cooking oil degradation suppression filter considering global environment protection, the loss of the sufficient degradation suppression function can be suppressed.

DESCRIPTION OF EMBODIMENTS

Figure 1:
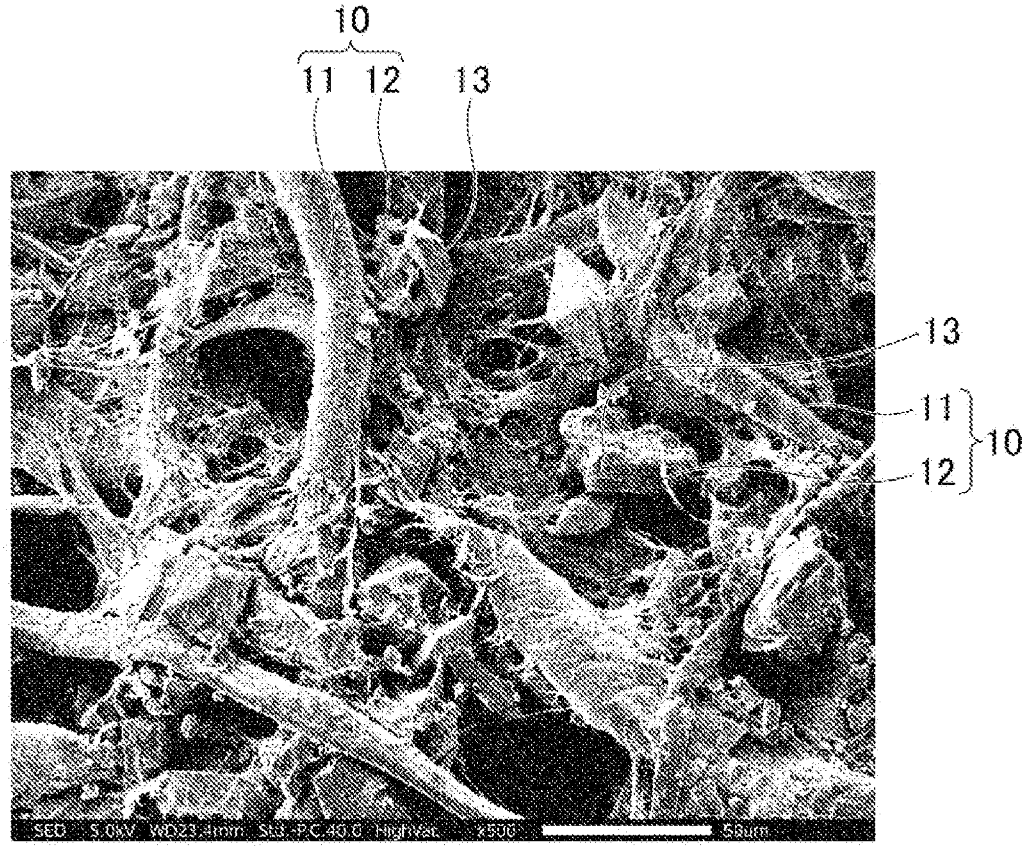
FIG. 1 is a photograph in substitution for a diagram illustrating a surface of a cooking oil degradation suppression filter according to an example.

An embodiment of a cooking oil degradation suppression filter according to the present invention will be described below. Hereinafter, the cooking oil degradation suppression filter will also be simply referred to as "filter". The embodiment is an example of the present invention, and the present invention is not limited to the embodiment. Various changes or improvements can be made for the embodiment, and configurations to which the changes or the improvements are applied can be included in the present invention.

[Cooking Oil Degradation Suppression Filter]

The cooking oil degradation suppression filter according to the embodiment includes fiber and a degradation suppression agent. Hereinafter, the fiber and the degradation suppression agent that can be used in the cooking oil degradation suppression filter according to the embodiment will be described in detail.

<Fiber>

As the fiber that is used as a material of the filter, either or both of natural fiber and artificial fiber can be used. The fiber can also be used as it is, and is preferably refined. By using the refined fiber as the material of the filter, the holding power of the degradation suppression agent can be significantly improved. The fiber is fluffed by the refinement, and a stem and a branch branched from the stem are formed.

The branch is finer than the stem, and is entangled with a particulate degradation suppression agent in liquid in a manufacturing step. Therefore, the branch can strongly hold the degradation suppression agent. Accordingly, when used cooking oil is filtered using the filter according to the embodiment, the separation of the degradation suppression agent can be prevented, and the degradation suppression agent can be prevented from being incorporated into the filtered cooking oil.

In the cooking oil degradation suppression filter according to the embodiment, to obtain the effect of sufficiently holding the degradation suppression agent, a diameter of the branch is preferably 50% or less, more preferably 40% or less, and still more preferably 30% or less with respect to a diameter of the stem. "The refined fiber" includes disintegrated fiber.

In the filter according to the example, the fiber, preferably, the refined fiber holds the degradation suppression agent. Therefore, a powder filter aid that is used in a general filter does not need to be used. Accordingly, oxidative degradation of cooking oil can be effectively and easily suppressed without using an aid or the like. In a step of scattering the filter aid, the powder does not fly and does not need to be collected in the form of a clay during cleaning after filtration. Thus, the work efficiency during filtration of cooking oil can be improved.

The filter aid may be used as necessary, and the amount thereof used can also be reduced as compared to the amount of the filter aid in a filter that is generally used.

As described below, the filter according to the embodiment can be obtained by removing liquid from a suspension including the fiber, preferably, the refined fiber and the degradation suppression agent and drying the suspension. It is considered that the suspension includes particles including the degradation suppression agent held by the branch and, when the degradation suppression agent is dissolved, the degradation suppression agent is present inside the fiber and on a surface of the fiber, and the effect of suppressing the degradation of cooking oil can be further improved.

(Natural Fiber)

The natural fiber refers to fiber manufactured from a natural material. The kind of the natural fiber is not particularly limited, and examples thereof include wood pulp, cotton, wool fiber, and hemp. In the embodiment, the natural fiber may be used alone, artificial fiber described below may be used alone, and both thereof may be used. Here, it is preferable that natural fiber that is likely to be fluffed is used as a main component. The main component refers to a state where the amount of the natural fiber used is more than 50 mass % with respect to the total mass of the fiber used during the manufacturing of the filter, and the amount of the natural fiber used is preferably more than 60 mass % and more preferably more than 70 mass %.

(Artificial Fiber)

When the artificial fiber is used, at least one selected from regenerated fiber and plastic fiber can be used. Examples of the regenerated fiber include rayon. Examples of the plastic fiber include polyester resin fiber, polyolefin resin fiber (for example, polyethylene fiber or polypropylene fiber), polyamide resin fiber (for example, polyamide 66 fiber), vinyl resin fiber, acrylic resin fiber, and polyurethane resin fiber. All of the fibers are fluffed by refinement, and the branch can hold the particulate degradation suppression agent. Therefore, the degradation suppression effect of cooking oil can be obtained without the separation of the degradation suppression agent.

Regardless of whether the fiber to be used is natural fiber or artificial fiber, an average fiber length and an average fiber diameter are not particularly limited. Typically, the average fiber length is preferably 0.1 to 15 mm, and the average fiber diameter is preferably 0.005 to 0.1 mm.

(Other Fibers)

In the embodiment, in addition to the natural fiber and the artificial fiber, other fibers may be included. Examples of the other fibers include metal fiber, glass fiber, and carbon fiber.

<Degradation Suppression Agent>

The degradation suppression agent used in the filter according to the embodiment has the effect of suppressing the degradation of cooking oil by coming into contact with the cooking oil. As the degradation suppression agent, at least one selected from a carbonate such as calcium carbonate or magnesium carbonate, a silicate such as calcium silicate or magnesium silicate, a tartrate such as potassium hydrogen tartrate, an oxide such as magnesium oxide, calcium oxide, or aluminum oxide, a hydroxide such as magnesium hydroxide or calcium hydroxide, an alginate such as calcium alginate, and a phosphate such as trimagnesium phosphate is preferably used.

In particular, at least one selected from a tartrate, an oxide, and a hydroxide is more preferably used.

The degradation suppression agent may be chemically synthesized during a manufacturing step. For example, when calcium oxide reacts with water as a solvent of an aqueous suspension, calcium hydroxide is synthesized. The calcium hydroxide may be present in the filter.

In the filter according to the embodiment, the mass of the degradation suppression agent with respect to the total mass of the filter is preferably 1 mass % or more and is preferably 80 mass % or less. When the mass of the degradation suppression agent with respect to the total mass of the filter is 1 mass % or more, the effect of suppressing the degradation of cooking oil can be obtained. When the mass of the degradation suppression agent with respect to the total mass of the filter is 80 mass % or less, the effect of preventing the separation of the degradation suppression agent can be obtained. When a plurality of cooking oil degradation suppression agents are used in combination, the total amount thereof is preferably within the above-described numerical range.

The mass of the degradation suppression agent with respect to the total mass of the filter is more preferably 60 mass % or less and still more preferably 50 mass % or less.

The mass of the degradation suppression agent with respect to the total mass of the filter can be calculated, for example, by cleaning the filter with liquid in which the fiber is insoluble and the degradation suppression agent is soluble, allowing the degradation suppression agent present on the surface of the fiber and inside the fiber to be dissolved in the liquid and removed, drying the fiber portion, and measuring a difference in mass thereof.

The mass of the degradation suppression agent can also be calculated by cleaning the filter with liquid in which the degradation suppression agent is insoluble and the fiber is soluble, allowing the fiber to be dissolved in the liquid and removed, drying the degradation suppression agent portion, and measuring a difference in mass thereof.

The mass of the degradation suppression agent can be calculated by burning and dissolving the organic matter to remove the organic matter and measuring the ash content.

When an oxide is used as the degradation suppression agent, examples of the oxide include oxides of alkaline earth metals. The alkaline earth metals include not only four elements of calcium (Ca), strontium (Sr), barium (Ba), and radium (Ra) but also beryllium (Be) and magnesium (Mg).

The alkaline earth metal oxide may be used alone, or a combination of the alkaline earth metal oxide and another degradation suppression agent may be used. Examples of the other degradation suppression agent include a hydroxide such as magnesium hydroxide or calcium hydroxide, a carbonate such as calcium carbonate or magnesium carbonate, a silicate such as calcium silicate or magnesium silicate, a tartrate such as potassium hydrogen tartrate, an alginate such as calcium alginate, and a phosphate such as trimagnesium phosphate. Among the examples, one kind can be used alone, or two or more kinds can be used in combination.

<Hydration Reaction Retardant>

As described above, oxides such as the alkaline earth metal oxide as the degradation suppression agent cause a hydration reaction to occur such that the sufficient degradation suppression function may be lost. Accordingly, a hydration reaction retardant having an action of retarding the hydration reaction is used in combination. As the hydration reaction retardant, specifically, a sugar alcohol is used.

As the sugar alcohol, specifically, at least one selected from erythritol, glycerin, lactitol, maltitol, mannitol, xylitol, and sorbitol is preferably used. In particular, at least one selected from glycerin and sorbitol is preferably used from the viewpoint of further improving the hydration reaction suppressing effect.

A molecular weight of the sugar alcohol is more preferably 500 or lower and still more preferably 250 or lower. When the molecular weight of the sugar alcohol is 500 or lower, the sugar alcohol is dissolved well in water as a dispersion medium. Therefore, the effect of retarding the hydration reaction is further improved.

As in a manufacturing method described below, an aqueous suspension is preferably used considering environment protection. However, oxides such as the alkaline earth metal oxide are insoluble in water, and thus is attached to the fiber in the form of particles to remain in the filter. On the other hand, the sugar alcohol is water-soluble, and thus is removed from the filter together with water when liquid is removed from the aqueous suspension. However, although the amount thereof is small, the sugar alcohol is attached to the oxide or the fiber to remain in the filter. The amount of the sugar alcohol remaining in the filter is so-called "trace amount".

The sugar alcohol remaining in the filter has an effect of suppressing the occurrence of a hydration reaction of water in air, a small amount of water in cooking oil, and an oxide. To reliably obtain the effect, the remaining amount of the sugar alcohol in the filter is preferably 10 ppm or higher and more preferably 50 ppm or higher per 1 g of the cooking oil degradation suppression filter.

As the hydration reaction retardant, at least one selected from an organic acid salt, a sulfate, a monosaccharide, and a disaccharide can be used.

Examples of the organic acid salt include citric acid, acetic acid, lactic acid, and the like and a citrate such as calcium citrate, potassium citrate, or sodium citrate, an acetate such as calcium acetate, potassium acetate, or sodium acetate, and a lactate such as calcium lactate, potassium lactate, or sodium lactate. Examples of the sulfate include calcium sulfate. Examples of the monosaccharide include glucose, fructose, mannose, and galactose. Examples of the disaccharide include sucrose. Among the examples, one kind may be used alone, and a combination of plural kinds may also be used. In particular, at least one selected from citric acid, calcium sulfate, and sucrose is preferably used from the viewpoint of further improving the hydration reaction suppressing effect.

A molecular weight of the above-described components is more preferably 500 or lower and more preferably 400 or lower. When the molecular weight of the above-described components is 500 or lower, the sugar alcohol is dissolved well in water as a dispersion medium. Therefore, the effect of retarding the hydration reaction is further improved.

As in the above-described sugar alcohol, the above-described components remain as the trace amount in the filter and suppress a hydration reaction of water in air or a small amount of water in cooking oil. To reliably obtain the effect, the remaining amount of the hydration reaction retardant in the filter is preferably 10 ppm or higher and more preferably 50 ppm or higher per 1 g of the cooking oil degradation suppression filter.

<Other Additives>

In the filter according to the embodiment, an adsorbent having a decoloration and deodorization effect may be used in addition to the degradation suppression agent and the hydration reaction retardant. As the adsorbent, at least one selected from silicon dioxide, natural clay, artificial clay, and activated carbon is preferably used.

Even when the adsorbent is used, the branch of the refined fiber can hold the adsorbent, such that the additive can be prevented from being incorporated into the filtered cooking oil, and excellent decoloration and deodorization effect can be obtained.

[Method of Manufacturing Cooking Oil Degradation Suppression Filter]

Regarding the cooking oil degradation suppression filter according to the embodiment, first, (1) the fiber, preferably, the refined fiber, (2) the degradation suppression agent, and (3) optionally another degradation suppression agent or the adsorbent are put into an appropriate solvent and are mixed to obtain a suspension. When the natural fiber is used, water can be used as the solvent. When the artificial fiber is used, liquid suitable for refining the fiber to be used can be selected.

As the suspension, an aqueous suspension is preferable from the viewpoint of environment protection, and when the oxide is used as the degradation suppression agent, the hydration reaction retardant is used in combination. The hydration reaction retardant and the degradation suppression agent may be put into water at the same time. However, it is preferable to put the degradation suppression agent into water after sufficiently dissolving the hydration reaction retardant in the water from the viewpoint of more effectively suppressing the loss of the sufficient degradation suppression function.

An example of a method of obtaining the refined fiber may be putting the fiber into water together with the component (2) or the component (3) when the suspension is obtained, and performing a refinement process using a refining machine such as a refiner or a beater or a mixing dispersing machine such as a dissolver or a homogenizer. Through the refinement process, the fiber can be fluffed, and the fiber can be uniformly dispersed in the suspension.

After putting only the fiber into water first and performing the refinement process using the refining machine, the mixing dispersing machine, or the like, the degradation suppression agent may be put.

Chemicals such as a paper strengthening agent, a retention aid, a pH adjuster, and a fixing agent that are generally used for manufacturing the filter may be added to the suspension. The addition amounts of the chemicals are not particularly limited as long as there are no effects on a human body.

By removing liquid from the suspension and drying the suspension, the filter where the particles including the degradation suppression agent are held by the fiber can be obtained.

For the liquid removal, water may be vaporized, or dehydration may be performed by filtration (papermaking).

In the manufacturing method according to the embodiment, the degradation suppression agent can be held by the fiber without using the binder or the like. Therefore, the degradation of cooking oil can be effectively prevented, and the filter where the separation of the degradation suppression agent is prevented can be easily manufactured.

A step for manufacturing a filter medium and a step for attaching an additive can be implemented by one step. Therefore, an increase in manufacturing cost can be suppressed, and an increase in environmentally hazardous substances or energy required for manufacturing can be suppressed.

When the oxide is used as the degradation suppression agent, the hydration reaction retardant is put into the aqueous suspension. Therefore, the loss of the degradation suppression function caused by the hydration reaction of the oxide can be effectively suppressed.

To allow the trace amount, preferably, 10 ppm or higher of the hydration reaction retardant per 1 g of the filter to remain, the content of the hydration reaction retardant in the suspension may be adjusted. Specifically, the content of the hydration reaction retardant in the suspension may be 0.01 mass % or more and preferably 0.05 mass % or more.

<Solution Including Degradation Suppression Agent>

As the degradation suppression agent used in the embodiment, an agent that is soluble in a solvent other than water can be used. In the above-described manufacturing method, when the refined fiber and a solution in which the degradation suppression agent is dissolved are mixed, it is considered that the solution penetrates into the fiber such that the fine particles including the degradation suppression agent are precipitated in the fiber in the subsequent liquid removal and drying step.

In a step where the refined fiber and the solution including the degradation suppression agent are mixed, when the particles including the degradation suppression agent are included in the solution, that is, when the degradation suppression agent is present as particles in the solution, the particles are likely to be entangled with the branch of the fiber. As a result, the solution including the degradation suppression agent is preferably a solution in which the degradation suppression agent is dissolved and the particles including the degradation suppression agent are included.

EXAMPLES

The cooking oil degradation suppression filter according to the present invention will be described below in more detail using examples. The present invention is not limited to the following examples.

Test Example 1

Cotton fiber was used as the natural fiber, calcium oxide and potassium hydrogen tartrate were used as the degradation suppression agent, and activated carbon was used as the adsorbent. The components were put into water, and the refinement process was performed using a mixer. The content of cotton fiber was 70 mass %, the content of calcium oxide was 10 mass %, the content of potassium hydrogen tartrate was 10 mass %, and the content of activated carbon was 10 mass % with respect to the total mass of the materials other than water.

Next, the solution was dehydrated by filtration and was dried to obtain the cooking oil degradation suppression filter according to the example. A surface and a cross-section of the obtained filter were captured as images with an electron microscope, and the state of the fiber and the degradation suppression agent was observed.

Figure 2:
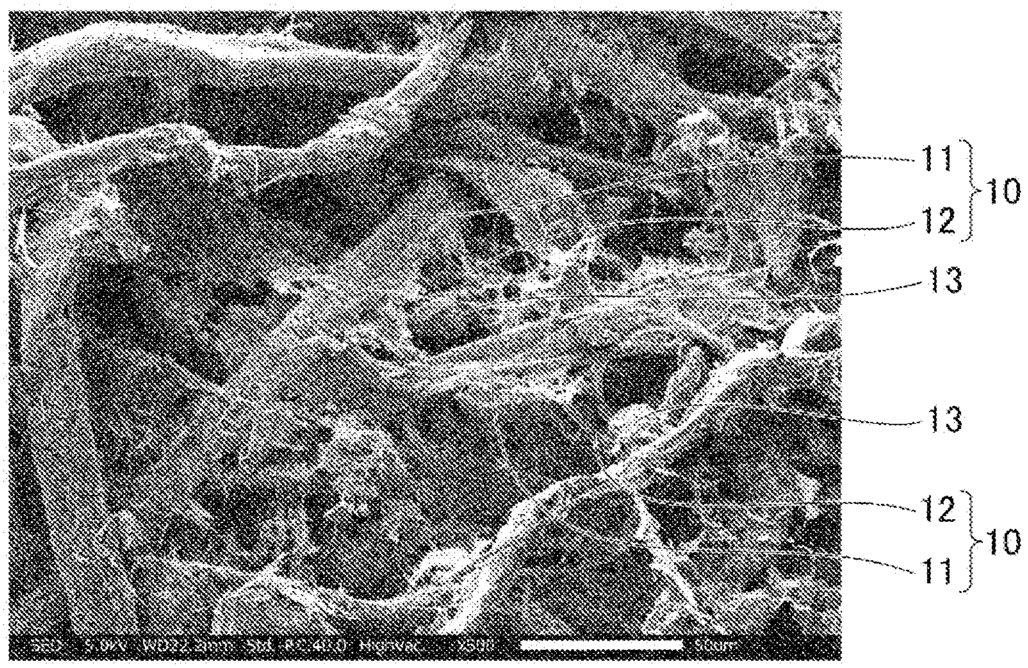
FIG. 2 is a photograph in substitution for a diagram illustrating a cross-section of the cooking oil degradation suppression filter according an example.

FIG. 1 is a photograph in substitution for a diagram illustrating the surface of the cooking oil degradation suppression filter according to the example. FIG. 2 is a photograph in substitution for a diagram illustrating the cross-section of the cooking oil degradation suppression filter according to the example. In FIG. 2, the upper section illustrates a surface part in the filter cross-section, and the lower section illustrates an intermediate part.

As illustrated in FIGS. 1 and 2, by refining cotton fiber 10, a branch 12 branched from a stem 11 is formed. The branch 12 is much finer than the stem 11, and thus a particulate degradation suppression agent 13 is entangled with the branch 12 and held.

Regardless of the particle diameter of the degradation suppression agent 13 or the position thereof such as the surface part, the intermediate part, and the like, the degradation suppression agent 13 is reliably held by the branch 12, and the degradation suppression agent 13 can be prevented from being separated from the filter without using a binder or the like.

Elemental analysis of the calcium oxide surface as the platinum-deposited degradation suppression agent was performed. As a result, potassium derived from water-soluble potassium hydrogen tartrate was detected, and it was verified that potassium was attached to calcium oxide powder.

Elemental analysis of the platinum-deposited fiber surface was performed. As a result, likewise, potassium (K) derived from water-soluble potassium hydrogen tartrate was detected, and it was verified that the degradation suppression agent was present on the fiber.

As a result, it is considered that the degradation suppression agent penetrates into the fiber such that the effect of suppressing the degradation of cooking oil can be further obtained.

Figure 3:
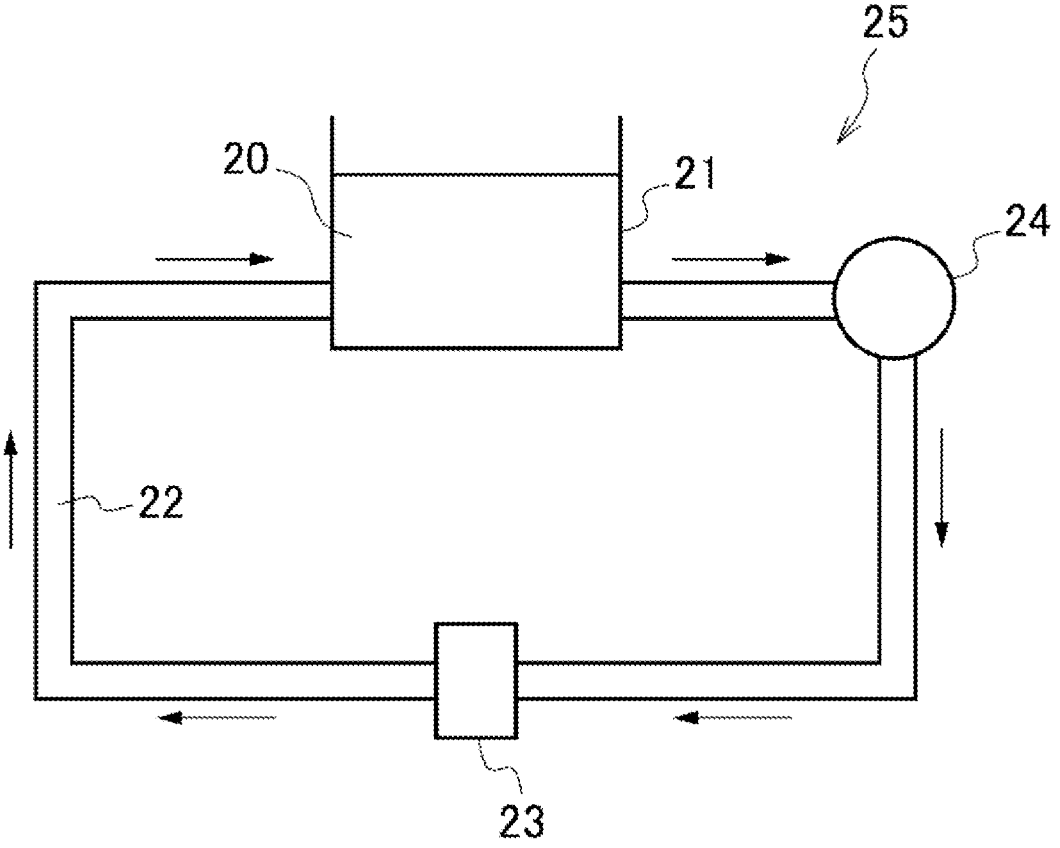
FIG. 3 is a schematic diagram illustrating an example of a cooking oil filtering device to which the cooking oil degradation suppression filter according to an example can be applied.

Next, FIG. 3 is a schematic diagram illustrating an example of a cooking oil filtering device to which the cooking oil degradation suppression filter according to the example can be applied.

A filtering device 25 includes an oil tank 21 where cooking oil 20 is stored, an annular pipe 22 through which the cooking oil 20 passes, a pump 24 that delivers the cooking oil 20, and a processing unit 23 where the cooking oil degradation suppression filter that filters the cooking oil 20 and suppresses the oxidative degradation thereof is loaded. The oil tank 21, the pump 24, and the processing unit 23 are connected in series through the annular pipe 22.

In the filtering device 25 having the above-described configuration, the cooking oil 20 in the oil tank 21 is delivered through the pipe 22 by the pump 24, the filtration and the suppression of the oxidative degradation are performed in the processing unit 23, and the cooking oil 20 returns to the oil tank 21. The used cooking oil 20 includes impurity such as fried scum and is oxidatively degraded. However, by causing the cooking oil 20 to pass through the cooking oil degradation suppression filter in the processing unit 23, the impurity such as fried scum is filtered, the oxidative degradation of the cooking oil 20 is suppressed, and the oxidation rate is delayed.

By circulating and processing the cooking oil 20 as described above, the cooking oil 20 that is used for cooking or the like can be continuously processed. For example, when the pipe 22 where the pump 24 and the processing unit 23 are disposed is connected to an oil tank of a fryer that fries food, the cooking oil 20 used for cooking can be processed in parallel with cooking.

When the oxidative degradation suppression performance of the cooking oil degradation suppression filter decreases, when the filterability of the filter decreases, or when cooking oil cannot pass through the filter due to clogging, the cooking oil degradation suppression filter in the processing unit 23 is replaced with a new filter.

A typical fried scum collection filter or the like can also be further provided on the front side of the cooking oil degradation suppression filter in a flow path.

The cooking oil degradation suppression filter according to the embodiment is not limited to the application to the filtering device 25, and can be applied to various filtering devices and filters.

Test Example 2

Example 1

Cellulose fiber was used as the natural fiber, calcium tartrate and potassium hydrogen tartrate were used as the degradation suppression agent, and activated carbon was used as the adsorbent. The components were put into water, and the refinement process was performed using a mixer. The content of calcium oxide was 10 mass %, the content of potassium hydrogen tartrate was 10 mass %, the content of activated carbon was 10 mass %, and the content of cellulose fiber was 70 mass % with respect to the total mass of the materials other than water. Next, the solution was dehydrated by filtration and was dried to obtain the cooking oil degradation suppression filter according to the example.

A disk having a diameter of 90 mm and a thickness of 2.8 mm was cut out from the prepared cooking oil degradation suppression filter to prepare a test piece A. The density of the test piece A was 0.28 g/cm$^3$.

Example 2

A disk having a diameter of 90 mm and a thickness of 0.6 mm was cut out from the same cooking oil degradation suppression filter as that of Example 1 to prepare a test piece B. The density of the test piece B was 0.43 g/cm$^3$.

Comparative Example

A disk having a diameter of 90 mm and a thickness of 1.0 mm was cut out from cellulose filter paper to prepare a test piece C. The density of the test piece C was 0.38 g/cm$^3$.

(Oxidative Degradation Suppression Test)

Using the test pieces A to C, an oxidative degradation suppression test was performed. For the test, the filtering device 25 illustrated in FIG. 3 was used.

That is, one of the test pieces A to C was loaded in the processing unit 23 of the filtering device 25, and 4 L of commercially available rapeseed oil as the cooking oil 20 was put into the oil tank 21 and was kept at 180° C. Here, the oil was delivered and circulated by the pump 24, and was filtered through the filter (test pieces A to C) of the processing unit 23. The oil in the oil tank was kept at 180° C.

After 80 hours, the cooking oil 20 was collected to measure an acid value. The acid value of the cooking oil 20 was measured by potentiometric titration (end point: pH 12) according to JIS K2501. The results are shown below. The oxidation suppression performance is shown as a relative value with respect to 1 as the acid value of Comparative Example.

TABLE 1

| | Filter | | Oxidative Degradation |
|---|---|---|---|
| | Thickness (mm) | Density ($g/cm^3$) | Suppression Performance after 80 hrs. (Acid Value/ Relative Value) |
| Example 1 (Test Piece A) | 2.8 | 0.28 | 0.58 |
| Example 2 (Test Piece B) | 0.6 | 0.43 | 0.39 |
| Comparative Example (Test Piece C) | 1.0 | 0.38 | 1.00 |

As such, it can be seen that, in the cooking oil degradation suppression filter according to the present invention, the oxidation suppression performance is much higher than that when only the fiber is used.

Hereinabove, the embodiments have been described with reference to the drawings, but it is needless to say that the present invention is not limited to the examples. It is obvious that those skilled in the art can conceive various change examples or modification examples within the scope of the claims, and it is understood that such examples are also included in the technical scope of the present invention. The components in the above-described embodiments may be freely combined within a range not departing from the scope of the present invention.

REFERENCE SIGNS LIST

10: fiber (cotton fiber)
11: stem
12: branch
13: degradation suppression agent
20: cooking oil
21: oil tank
22: pipe
23: processing unit
24: pump
25: filtering device

The invention claimed is:

1. A cooking oil degradation suppression filter comprising:
- fiber; and
- at least one degradation suppression agent selected from a carbonate, a silicate, a tartrate, an oxide, a hydroxide, an alginate, and a phosphate,
- wherein the at least one degradation suppression agent is present inside the fiber and on a surface of the fiber.

2. The cooking oil degradation suppression filter according to claim 1, wherein the at least one degradation suppression agent is at least one selected from a tartrate, an oxide, and a hydroxide.

3. The cooking oil degradation suppression filter according to claim 2, wherein the at least one degradation suppression agent is an oxide and further includes a hydration reaction retardant formed of a sugar alcohol.

4. The cooking oil degradation suppression filter according to claim 3, wherein the sugar alcohol is at least one selected from erythritol, glycerin, lactitol, maltitol, mannitol, xylitol, and sorbitol.

5. The cooking oil degradation suppression filter according to claim 4, wherein the sugar alcohol is either or both of glycerin and sorbitol.

6. The cooking oil degradation suppression filter according to claim 3, wherein a molecular weight of the sugar alcohol is 500 g/mol or lower.

7. The cooking oil degradation suppression filter according to claim 2, wherein the at least one degradation suppression agent is an oxide and further includes at least one hydration reaction retardant selected from an organic acid salt, a sulfate, a monosaccharide, and a disaccharide.

8. The cooking oil degradation suppression filter according to claim 7, wherein the at least one hydration reaction retardant includes at least one selected from citric acid, calcium sulfate, and sucrose.

9. The cooking oil degradation suppression filter according to claim 7, wherein a molecular weight of the at least one hydration reaction retardant is 500 g/mol or lower.

10. The cooking oil degradation suppression filter according to claim 3, wherein a content of the hydration reaction retardant is 10 ppm or higher per 1 g of the cooking oil degradation suppression filter.

11. The cooking oil degradation suppression filter according to claim 1, wherein the fiber includes refined fiber.

12. The cooking oil degradation suppression filter according to claim 11, wherein
- the fiber includes a stem and a branch branched from the stem by refinement, and
- the branch holds particles including the at least one degradation suppression agent.

13. The cooking oil degradation suppression filter according to claim 11, wherein the fiber is either or both of natural fiber and artificial fiber.

14. The cooking oil degradation suppression filter according to claim 13, wherein the artificial fiber is either or both of regenerated fiber and plastic fiber.

15. The cooking oil degradation suppression filter according to claim 1, further comprising an adsorbent.

16. The cooking oil degradation suppression filter according to claim 15, wherein the adsorbent includes at least one selected from silicon dioxide, natural clay, artificial clay, and activated carbon.

17. A method of manufacturing the cooking oil degradation suppression filter according to claim 1, the method comprising:
- obtaining a suspension including the fiber and the at least one degradation suppression agent; and
- removing liquid from the suspension and drying the suspension.

* * * * *